US012698924B2

(12) United States Patent
Desantes Fernandez et al.

(10) Patent No.: US 12,698,924 B2
(45) Date of Patent: Aug. 4, 2026

(54) METHOD AND EQUIPMENT FOR REFRIGERATION

(71) Applicants: UNIVERSITAT POLITÈCNICA DE VALÈNCIA, Valencia (ES); FLUID & THERMAL MANAGEMENT, S.L, Paterna (ES)

(72) Inventors: Jose Maria Desantes Fernandez, Valencia (ES); Jesus Vicente Benajes Calvo, Valencia (ES); Jaime Alberto Broatch Jacobi, Valencia (ES); Jose Galindo Lucas, Valencia (ES); Jose Ramon Serrano Cruz, Valencia (ES); Pablo Cesar Olmeda Gonzalez, Valencia (ES); Vicente Dolz Ruiz, Valencia (ES); Manuel Fernandez Bono, Paterna (ES)

(73) Assignees: UNIVERSITAT POLITÉCNICA DE VALENCIA, Valencia (ES); FLUID & THERMAL MANAGEMENT, S.L., Paterna (ES)

( * ) Notice: Subject to any disclaimer, the term of this patent is extended or adjusted under 35 U.S.C. 154(b) by 865 days.

(21) Appl. No.: 17/787,204

(22) PCT Filed: Dec. 17, 2020

(86) PCT No.: PCT/ES2020/070801
§ 371 (c)(1),
(2) Date: Jun. 17, 2022

(87) PCT Pub. No.: WO2021/123484
PCT Pub. Date: Jun. 24, 2021

(65) Prior Publication Data
US 2023/0036416 A1 Feb. 2, 2023

(30) Foreign Application Priority Data
Dec. 18, 2019 (ES) ................................. P201931124
Oct. 23, 2020 (WO) ................. PCT/ES2020/070648

(51) Int. Cl.
*F25B 9/00* (2006.01)
*B60L 58/26* (2019.01)
(Continued)

(52) U.S. Cl.
CPC ................ *F25B 9/004* (2013.01); *F25B 1/06* (2013.01); *F25B 1/10* (2013.01); *F25B 7/00* (2013.01);
(Continued)

(58) Field of Classification Search
CPC .... F25B 1/06; F25B 1/10; F25B 9/004; F25B 7/00; F25B 11/04; H01M 10/613; B60L 58/26
See application file for complete search history.

(56) References Cited

U.S. PATENT DOCUMENTS 10,612,821 B1 * 4/2020 Fernando .................. F25B 1/10
2011/0239659 A1 * 10/2011 Lior .......................... B60L 7/14
903/906
(Continued)

FOREIGN PATENT DOCUMENTS

DE 2828914 A1 1/1980
EP 0683364 A2 11/1995
(Continued)

OTHER PUBLICATIONS

Yamada (JP2010025438A), English Translation, Concurrent Plate Fin Type Heat Exchanger and Air Cycle Refrigeration System for Container, 2010, Whole Document (Year: 2010).*

*Primary Examiner* — Jerry-Daryl Fletcher
*Assistant Examiner* — Keith Stanley Myers
(74) *Attorney, Agent, or Firm* — LUCAS & MERCANTI, LLP

(57) ABSTRACT
The invention relates to a refrigeration method and equipment for cooling the inside of a container, or a coolant circulating in a refrigeration circuit of a vehicle and/or of a supercharger, which uses an air current as a working fluid and comprises the steps of: compressing; cooling in coolers coupled to an ejection cycle; expanding, to reduce the temperature of the air current and obtain mechanical energy from same; refrigerating, to allow an exchange of thermal energy between the air current resulting from the expansion step and the coolant of the refrigeration circuit or the inside of the container; and regenerating, to allow an exchange of thermal energy between the air current resulting from the compression step, reducing the temperature thereof, and the
(Continued)

air current resulting from the regenerating step, increasing the temperature thereof.

14 Claims, 7 Drawing Sheets

(51) Int. Cl.

| | | |
|---|---|---|
| *F25B 1/06* | (2006.01) | |
| *F25B 1/10* | (2006.01) | |
| *F25B 7/00* | (2006.01) | |
| *F25B 11/04* | (2006.01) | |
| *H01M 10/613* | (2014.01) | |

(52) U.S. Cl.
CPC ............... *F25B 11/04* (2013.01); *B60L 58/26* (2019.02); *H01M 10/613* (2015.04)

(56) References Cited

U.S. PATENT DOCUMENTS

| | | |
|---|---|---|
| 2016/0018134 A1 | 1/2016 | Ueda et al. |
| 2018/0087809 A1* | 3/2018 | Ueda ...................... F25J 1/0072 |

FOREIGN PATENT DOCUMENTS

| | | | |
|---|---|---|---|
| EP | 1788323 A1 | 5/2007 | |
| EP | 3249319 A1 | 11/2017 | |
| JP | 2010025438 A | 2/2010 | |

* cited by examiner

METHOD AND EQUIPMENT FOR REFRIGERATION

CROSS-REFERENCE TO RELATED APPLICATIONS

This application is a national phase entry under 35 U.S.C. § 371 of International Application PCT/ES2020/070801, filed Dec. 17, 2020, which claims priority to ES Patent Application No. P201931124, filed Dec. 18, 2019, and International Patent Application No. PCT/ES2020/070648, filed Oct. 23, 2020, all of which are herein incorporated by reference in their entirety.

OBJECT OF THE INVENTION

The present invention generally relates to a refrigeration method and equipment for being used in processes requiring refrigeration such as, for example, in vaccine preservation processes, in sample preservation processes, in machine heat dissipation, in cryogenisation processes, in wound treatment, etc.

More specifically, the present invention relates to a refrigeration method and equipment for being used in the ultra-rapid charging of batteries of hybrid or electric drive systems, mainly due to the large amount of thermal energy which needs to be discharged in a short period of time.

The present invention also specifically relates to a refrigeration method and equipment for being used in the refrigeration of the inside of a container.

One object of the invention is to provide a method which allows efficient refrigeration of a means or system; which particularly allows efficient refrigeration of a coolant circulating through a refrigeration circuit of a hybrid or electric drive system, through a refrigeration circuit of a supercharger, or through both; or which particularly allows efficient refrigeration of the inside of a container.

A second object of the invention consists of providing refrigeration equipment which allows a large amount of thermal energy to be removed with an efficient cycle which minimises energy losses, for being used in the refrigeration of a means or system which requires refrigeration; particularly for being used in the refrigeration of batteries of a hybrid or electric drive system, in the refrigeration of a supercharger, or both; or particularly for being used in the refrigeration of the inside of a container.

Another object of the present invention consists of providing a device which allows the refrigeration of batteries during a charging process.

BACKGROUND OF THE INVENTION

In the world of automotion, electric motors are one of the existing alternatives. Despite their long history, they have only recently started to take hold of a relevant market niche in the more developed countries. However, the two biggest drawbacks of electric motors compared to reciprocating internal combustion engines (RICE), which have traditionally been used on a massive scale, are: the low energy density of batteries compared to liquid fuel, a hundred times less energy available for the same weight; and the time need to replenish this energy.

In the case of RICEs, the time to refill 50 litres of fuel in the vehicle is in the order of 2 minutes, whereas in the case of batteries this can take 12 hours (if the charging of the battery is slow), between 3 and 6 hours (if the charging is rapid) and between 10 and 60 minutes if the charging system and the battery itself allow ultra-rapid charging.

In this latter case, the charge of the battery only reaches between 50% and 70% of its total capacity total, and furthermore, the size and weight of the charging system are substantial and, therefore, cannot be installed built into the vehicle because the increase in its weight would not be allowed. For that reason, these charging systems are usually located outside the vehicle, generally in recharging stations.

One of the limiting factors when it comes to ultra-rapid charging in batteries is that due to the amount of energy supplied in a limited period of time, it causes the battery temperature to increase. This temperature drastically shortens the battery life compared to the service life batteries would have if they were always charged slowly, with a controlled temperature. Furthermore, the temperature has to be regulated to prevent the risk of the batteries catching fire. To be able to use this recharging system without the risk of fire and without so drastically affecting the service life of batteries, there needs to be a system which allows the temperature of the battery to be controlled and maintained under acceptable and safe thresholds.

The most common refrigeration systems for batteries today are based on the use of a refrigeration circuit with a liquid which ultimately discharges the heat removed from the batteries into the air conditioning circuit of the vehicle, based on organic phase change coolants, such as very long-chain hydrocarbons, or into the ambient air in different possible ways, such as, for example, through large batteries of forced draft exchangers.

The use of organic phase change coolant(s) or coolant vectors in liquid state has several drawbacks, among which four should be mentioned specifically. First, they are usually not environmentally-friendly since they have a high global warming potential (GWP). Second, due to the use of compressors and fans, they tend to be noisy, resulting in discomfort for the user. Third, coupling and uncoupling of pressurised fluid connections in the vehicle involves problems with air intake, air venting, fluid leakage and user inconvenience. And fourth, the thermal inertia, i.e., the time it takes the system to reach working temperatures, of these systems is very large due to the characteristics of the fluids used, making them unappealing for this application.

The state of the art includes document US2013029193A1, "Rapid charging electric vehicle and method and apparatus for rapid charging", which describes a system for blowing air, with the fan of the vehicle, towards the batteries or for providing an external coolant and liquid. However, this solution entails difficulties in the coupling system such as those mentioned above. Also, by being connected with the liquid refrigeration circuit of the vehicle, it may cause failures such as, for example, air infiltration or damage to the circuit. Lastly, the document does not describe how the fluid used as the cold vector is cooled.

Document US2014292260A1, "Electric battery rapid recharging system and method for military and other applications", describe the refrigeration of a battery with air, where the air is obtained from the Engine Cooling Unit (ECU). The ECU is the refrigeration system of the vehicle carrying the charging system of the battery. However, it does not have a system dedicated to obtaining cold air. Likewise, it interacts with the refrigeration of the battery when the vehicle is running, which leads to the possibility of failures and makes the battery design more difficult.

Document US2013294890A1, "Reverse Brayton cycle with bladeless turbo compressor for automotive environmental cooling", relates to a passenger air conditioning system in a vehicle, where the energy needed to cause compression comes from exhaust gases of a combustion engine. A regenerator is also installed to temper the cooled air by reheating it with ambient air.

Document US2011239659A1, "Cooling for hybrid electric vehicle", relates to the cooling of the passenger compartment and has a vacuum reverse Brayton cycle (VRBC) for that purpose.

Document US2002043413A1, "Vehicle battery cooling apparatus", discloses the additional use of a conventional reverse Rankine cycle used for the air conditioning of passengers in the vehicle to cool batteries during charging, which has a power that is incompatible with the power dissipation needs of ultra-rapid battery charging systems.

Document US2013086927A1, "Integrated air-cycle refrigeration and power generation system", discloses a non-vacuum reverse Brayton cycle with a regenerator, which uses the residual thermal energy of an engine for operation. Likewise, the residual energy of the reverse Brayton cycle is dissipated into the environment in a gas-gas exchanger.

DESCRIPTION OF THE INVENTION

The invention relates to a refrigeration method to reduce the temperature of a coolant circulating through a refrigeration circuit which surrounds batteries and electronic components of hybrid or electric drive systems of a vehicle, and/or through a refrigeration circuit of a supercharger, by means of refrigeration equipment.

The vehicle, therefore, comprises an electric or hybrid drive system which, in turn, comprises batteries and other electronic components and a charging port. A refrigeration circuit circulates around the batteries and electronic components, and when the batteries are in operation or in the process of charging, it allows refrigerating them.

The charging port allows the vehicle to be connected to a supercharger, comprising a set of electronic components. The supercharger can also have a refrigeration circuit.

The equipment of the invention is for being connected to one or both refrigeration circuits, i.e., that of the vehicle or that of the supercharger, through a heat exchanger assembled in one or both refrigeration circuits. The coolant circulating through one or both refrigeration circuits is thus refrigerated in the heat exchanger by the equipment of the invention.

The equipment of the invention allows a low-temperature flow to be provided for cooling the coolant in a rapid and adaptable manner, since it allows a wide range of temperatures to be obtained without needing to modify the number of components of the equipment or the size of the equipment. Furthermore, the equipment of the invention is virtually independent of environmental conditions, and it can operate in a wide variety of environmental conditions.

The coolant can circulate through a refrigeration circuit which surrounds the batteries and electronic components of an electric or hybrid drive system, whereas the equipment of the invention cools said coolant, without needing to remove the coolant from the refrigeration circuit of the electric or hybrid drive system. The method of the invention, in this case, is for cooling the batteries during charging. In this case, the refrigeration circuit is equipped with at least one impeller pump to move the coolant and an onboard heat exchanger in the vehicle, which will allow the exchange of thermal energy between said coolant and the working fluid.

Likewise, the coolant can circulate through a refrigeration circuit extending inside a supercharger, and allows it to be refrigerated during the process of charging the batteries of a vehicle with a hybrid or electric drive system. The refrigeration circuit of the supercharger is also equipped with at least one impeller pump to move the coolant and a heat exchanger, which will allow the exchange of thermal energy between said coolant and the working fluid.

The refrigeration method of the invention uses an air current as a working fluid. The air is obtained at atmospheric pressure and temperature and will go through multiple steps for the purpose of efficiently reducing its temperature and subsequently collecting thermal energy of the coolant of the refrigeration circuit, cooling same. The low thermal inertia of the air allows to reduce the time needed for the equipment to reach working conditions and start cooling the coolant.

Likewise, the use of air reduces the cost of losses due to leakages, facilitates the connection and disconnection in a clean and simple manner, and avoids the use of other coolants which may be contaminating, corrosive or even toxic, with all this being in a circuit which will not be open to the atmosphere at any time.

The air current first passes through a compression step in a first mechanical compressor, preferably operated by an electric motor, to increase the pressure of the current. This increase in pressure entails an increase in temperature of the air current.

The air current is subsequently cooled in a regeneration step.

The method of the invention also comprises an expansion step which even further reduces the temperature of the air current by means of the expansion of said air current, reducing the pressure of the air current and removing, as a result of that pressure reduction, mechanical energy supplied to the compression step for the purpose of making it more efficient. The temperature reduction by means of the expansion of the air current allows lower temperatures to be reached almost instantaneously, preventing the thermal inertia that occurs in the heat transfer processes in a conventional heat exchanger, which require more time.

Next, the air current, the temperature of which has already been reduced in the regeneration and expansion steps, comes into thermal contact, by means of an air-coolant heat exchanger, with the coolant of the refrigeration circuit, such that said coolant gives off thermal energy to the air current. The heat exchanger can be incorporated in the refrigeration circuit of the drive system and/or in the refrigeration circuit of the supercharger. The air current, therefore, increases in temperature, although the temperature of the current will be lower than the temperature of the air current after the regeneration step.

The air current that has been used for cooling the coolant of the refrigeration circuit in the refrigeration step, passes on to the regeneration step, where it is used to reduce the temperature of the air current resulting from the compression step. The thermal energy is thereby transferred between the same air current, but in two different steps of the cycle, on one hand, the air current resulting from the compression step gives off thermal energy whereas the air current resulting from the refrigeration step receives said thermal energy.

Preferably, the air current used in the refrigeration equipment has a low humidity, since excessive humidity can lead to water condensation when the temperature of the air current decreases, which would give rise to energy efficiency losses, and even to corrosion problems. As a result, the method of the invention can comprise, prior to the compression step, a drying step, to reduce the humidity of the ambient air current. The drying step can preferably be performed by means of using a drying filter which, among others, can be made of silica gel.

Moreover, after the expansion step the air current can be recirculated, preferably by means of a 3-way valve without passing through the heat exchanger to return to the regeneration and compression step, starting the cycle described in the method of the invention again. This allows the air and the rest of the components used in the invention to be kept tempered at the temperature working between a first use and a subsequent use of the installation. In the event that the drying step is also included, the recirculation of the air current prevents the need to reduce the humidity of the air current again, which must only be performed in the case of introducing ambient air again, if there were any air losses due to leakages.

Preferably, the compression and expansion steps are carried out by means of turbomachines, which can be compressors for compression and turbines for expansion. The use of turbomachines instead of volumetric machines, such as piston, vane or screw compressors, provides a high specific power and very low mechanical inertia. Such that the regulation of the system is more rapid and the time needed for the equipment to reach stable working conditions is reduced. Likewise, the refrigeration and regeneration steps are preferably carried out by means of heat exchangers, which can be plate, shell and tube, or cross-flow heat exchangers, among others.

The compression step can preferably be performed in phases, instead of using a single step. A more pronounced increase in pressure with high efficiency can thereby be caused. Likewise, a cooling phase can be included between each phase of the compression step to reduce the temperature of the air current resulting from the compression step, with the efficiency of the compression process being further increased.

The cooling phases can preferably be carried out by means of a cooler, i.e., a heat exchanger which allows the heat transfer between the air current and a coolant, which preferably has a very low global warming potential (GWP), particularly ammonia or carbon dioxide. Each of the cooling phases removes a specific thermal energy from the air current.

The coolers, in turn, can operate like the heat recovery units and evaporators of an ejection cycle which uses a coolant having a low GWP. The ejection cycle is included instead of a cycle with a volumetric compressor and comprises: an ejector, which is responsible for increasing the pressure of the coolant, which has a low GWP, in the gas state; a pump; a condenser; and it furthermore uses the coolers, making the process more efficient.

The invention also relates to the refrigeration equipment for the ultra-rapid charging of batteries of electric or hybrid drive systems for cooling a coolant circulating in a refrigeration circuit.

The refrigeration equipment of the invention uses an ambient air current as a working fluid. The equipment comprises a first compressor, which is operated by means of an electric current, preferably of the supercharger to which the drive system is connected. The first compressor absorbs the ambient air current, which is introduced in the refrigeration equipment through an inlet with ambient pressure, which is increased due to the effect of the action of the compressor on the air current.

The compression of the air by means of the compressor also causes an increase in the temperature of the air current which passes through the compressor. The air current introduced by the compressor in the equipment can have excessive humidity, which can lead to water condensation when the temperature of the air current decreases, which would give rise to energy efficiency losses. For this reason, a drying filter can preferably be placed at the inlet of the equipment, prior to the first compressor, to reduce the humidity of the air current. This drying filter can preferably be made of silica gel.

For the purpose of increasing the efficiency of the equipment, it can further comprise a set of compressors and a set of coolers, intercalated with the compressors, such that compression of the air current is not performed in a single phase, but rather in multiple compression and cooling phases.

Therefore, once the air current has been compressed, its pressure has been increased, due to the effect of the action of the first compressor, the air current can pass through a first cooler, which reduces the temperature of the air current, removing a specific amount of heat by heat transfer with a coolant, which preferably has a very low global warming potential (GWP).

Once the air current has passed through the first cooler, it can pass to a second compression step, in which a second compressor increases the pressure of the air current again. Likewise, the increase in pressure in the second compressor has an associated increase in temperature in the air current due to the thermodynamic compression process and its associated losses, which will determine the efficiency thereof.

Next, the air current could pass through a variable set of coolers and compressors which efficiently increase the pressure of the air current. Two compressors with two coolers intercalated between same are preferably used.

The equipment of the invention can also comprise an ejection cycle, connected with the coolers.

The ejection cycle uses a coolant having a low GWP at high pressure and comprises a pump to direct a primary flow of coolant towards the first cooler, which acts like the heat recovery unit of the ejection cycle, and a rolling valve to direct a secondary flow of coolant towards the second cooler, which acts like an evaporator of the ejection cycle.

The ejection cycle further comprises an ejector, comprising a nozzle, through which the primary flow of coolant is introduced and accelerated, an intake which absorbs the secondary flow of coolant due to the pressure drop in the primary flow that has been accelerated in the nozzle, the primary and secondary flow of coolant mixed into a coolant current having a low GWP, and a sprayer which increases the pressure of the coolant current.

Likewise, the ejection cycle also comprises a condenser which reduces the temperature of the coolant current such that it changes from the gas phase to the liquid phase.

Furthermore, the ejection cycle comprises a flow divider, to divide the coolant current and direct the primary flow of coolant towards the pump and the secondary flow of coolant towards the rolling valve, the ejection cycle starting again. Preferably, the flow divider consists of a fork of a conduit containing the coolant current, such that a first part of said current forms the primary flow of coolant and a second part of said current forms the secondary flow of coolant.

After reaching the last of the compressors or coolers, the air current passes to a regenerator, i.e., a heat exchanger, to reduce the temperature of the air current.

Subsequently, the air current passes through a turbine to cause an expansion of the air current, as a result of which the temperature and pressure of the air current are reduced. Preferably, the turbine is mechanically connected with one of the compressors for the purpose of transmitting the rotary kinetic energy generated in the shaft of the turbine to said compressor and thus reducing the consumption of external energy, the compressor and turbine forming a turbo generator set.

Next there is placed a heat exchanger, in which the air current comes into thermal contact with the coolant of the vehicle and/or of the supercharger, and collects thermal energy from said coolant. In that way, coolant is cooled and the air current increases its temperature.

Then the air current returns to the regenerator, where it receives thermal energy, thus cooling the air current exiting the last of the compressors or coolers.

Preferably, the expansion ratio of the turbine is 3 or higher for the purpose of producing a large reduction of the temperature of the air current, which is preferably 125 degrees centigrade below 0.

The equipment can also comprise a 3-way valve located right behind the turbine, such that upon activation it redirects the air exiting the turbine directly towards the regenerator without previously passing through the heat exchanger. This valve allows the circulation of the air current through the equipment to be maintained even when the coolant of the electrical equipment of the vehicle and/or the supercharger itself is not being cooled. The temperature of the air current is thus maintained for when the coolant needs to be cooled again, instead conditioning the ambient air again.

Likewise, turbomachines comprising the equipment can operate intermittently to consume less energy, acting on the air current only when needed.

The equipment of the invention allows air to be generated at a very low temperature to continuously cool the coolant of the refrigeration circuit. In the ultra-rapid charging state of the battery, there is a very large amount of heat to be discharged, so the power of the equipment must be consistent with those needs. The equipment of the invention allows a very high refrigeration power to be obtained without needing to increase the size of the equipment.

In the event that the coolant circulating through the refrigeration circuit of the vehicle is refrigerated, said circuit can comprise two sets of pipes each connected with an impeller pump of the coolant. One would be actuated when the vehicle is travelling and the batteries are operating supplying energy to the electric motor, and the other one, which has a higher refrigeration capacity, will be actuated when the vehicle is parked in battery recharging mode.

As set forth above, the refrigeration equipment of the present invention allows a very low-temperature air current to be obtained after passing through the turbine. This very low-temperature air current allows a large amount of thermal energy to be removed from any means or system which requires refrigeration, regardless of the nature thereof. Therefore, with the same components and performing the same functions mentioned above, the refrigeration equipment of the present invention is suitable not only for the ultra-rapid charging of batteries of electric or hybrid drive systems, but also for other processes requiring refrigeration. The equipment of the present invention can be, for example, for cooling containers. The containers can be of different types, for example, refrigeration containers for the storage and/or transport of temperature-sensitive material, such as vaccines, pharmaceutical products, samples, chemicals, foodstuffs, etc.

As set forth, the invention relates to a refrigeration method for cooling the inside of a container by means of refrigeration equipment.

Similarly to that set forth above in reference to the application of the invention to the cooling of a coolant circulating through a refrigeration circuit, the refrigeration method of the present invention for cooling the inside of a container uses an air current as a working fluid and comprises the following steps:

a. compressing, to increase the pressure of the air current,
b. expanding, to reduce the temperature of the previously compressed air current, at the same time that mechanical energy is obtained by means of reducing the pressure of said air current,
c. refrigerating, to allow an exchange of thermal energy between the air current resulting from the expansion step and the inside of the container,
d. regenerating, to allow an exchange of thermal energy between the air current resulting from the compression step and the air current resulting from the refrigeration step, increasing the temperature of the air current resulting from the refrigeration step and reducing the temperature of the current resulting from the compression step.

Preferably, the compression step can be performed in phases, alternating a compression phase with a cooling phase of the working air, in which one or more coolers remove heat from the air current.

More preferably, the cooling phase can comprise the use of at least two coolers connected with an ejection circuit, in which the coolers operate like a heat recovery unit or an evaporator.

The ejection cycle is included instead of a cycle with a volumetric compressor and comprises: an ejector, which is responsible for increasing the pressure of the coolant, which has a low GWP, in the gas state; a pump; a condenser; and it furthermore uses the coolers, making the process more efficient.

Similarly to that set forth above in reference to the application of the invention to the cooling of a coolant circulating through a refrigeration circuit, the refrigeration equipment of the present invention for cooling the inside of a container uses an air current as a working fluid and comprises:

at least one first compressor, configured to absorb air and increase the pressure thereof, producing a compressed air current, a regenerator, connected with the first compressor, to receive the compressed air current, a turbine, connected with the regenerator, to receive the air current of the regenerator and produce an expansion of this air current, a heat exchanger, connected with the turbine, with the inside of the container and with the regenerator, to receive the air current expanded in the turbine, to allow the heat transfer between the inside of the container and said expanded air current, and then deliver the air current to the regenerator, which recirculates it towards the first compressor, wherein the regenerator receives the compressed air current of the first compressor, to reduce the temperature thereof, and the air current of the heat exchanger, to heat it by means of heat exchange between both.

The use of turbomachines or volumetric machines for the compression and expansion steps does not affect the essence of the invention. A volumetric compressor and expander will thereby be understood herein to be means equivalent to a rotodynamic compressor or turbine, respectively.

Preferably, the equipment further comprises a first cooler, connected to the first compressor and intended to reduce the temperature of the air current compressed by the first compressor. More preferably, the first cooler operates with a coolant selected from those having the lowest global warming potential (GWP), such as ammonia or carbon dioxide.

More preferably, the equipment further comprises at least one second compressor, configured to absorb air from the first cooler and increase the pressure thereof; and at least one second cooler, connected to the second compressor and to the regenerator, to reduce the temperature of the air current compressed by the second compressor and deliver it to the regenerator. The turbine can be mechanically connected with one of the compressors for the purpose of transmitting the rotary kinetic energy generated in the shaft of the turbine to said compressor and thus reducing the consumption of external energy, the compressor and turbine forming a turbo generator set.

The first and second cooler can preferably operate with a coolant selected from those having the lowest global warming potential (GWP), such as ammonia or carbon dioxide.

The equipment can preferably comprise a drying filter, adapted to reduce the humidity of the air absorbed by the first compressor, and connected to the first compressor to supply a dry air current to same. This drying filter can preferably be made of silica gel.

The equipment of the invention can also comprise an ejection cycle, connected with the coolers. The ejection cycle preferably comprises:

a pump, to direct a primary flow of coolant in liquid state towards the first cooler, to receive thermal energy of the air current, such that it transitions to a gaseous state, a rolling valve, to direct a secondary flow of coolant towards the second cooler, to receive thermal energy of the air current, such that it transitions to a gaseous state, an ejector, comprising a nozzle, which receives the primary flow of the first cooler and accelerates said primary flow to the mixing area; an intake, connected to the second cooler to receive the secondary flow, which is suctioned towards the mixing area of the ejector due to the pressure drop of the main flow, the primary and secondary flow of coolant mixed into a single coolant current; and a sprayer throttling back and increasing the pressure of the coolant current at the outlet of the ejector, a condenser which reduces the temperature of the coolant current such that it changes from the gas phase to the liquid phase, and a flow divider, to divide the condensed coolant current, directing the primary flow towards the pump and the secondary flow towards the rolling valve.

Depending on the characteristics of the components of the equipment, temperatures of 200 degrees centigrade below 0 can be achieved for the air current upon exiting the turbine, such that the inside of the container and any material located therein can be refrigerated at temperatures of 110 degrees centigrade below 0.

Preferably, the expansion ratio of the turbine is 3 or higher for the purpose of producing a large reduction of the temperature of the air current, which is preferably around 125 degrees centigrade below 0, upon exiting the turbine.

The equipment can also comprise a 3-way valve connected to the turbine, such that upon activation it redirects the air exiting the turbine directly towards the regenerator without previously passing through the heat exchanger.

Likewise, at least one compressor can operate intermittently to consume less energy, acting on the air current only when needed.

The refrigeration equipment of the invention can be connected to the inside of the container either directly or through a thermodynamic heat exchange device. In the event that the refrigeration equipment is connected directly to the inside of the container, the actual inside of the container is a direct contact heat exchanger, in which the air current from the refrigeration equipment and the inner fluid of the container, preferably air, come into contact, producing the heat transfer between both fluids.

Preferably, the heat exchanger is an indirect contact exchanger, i.e., there is no mixture of fluid; and the air current from the refrigeration equipment and a coolant of the container circulate through the heat exchanger. The coolant circulates through a refrigeration circuit which removes heat from inside the container. The air current of the refrigeration equipment in turn removes heat from the coolant.

Optionally, the heat exchanger is an indirect contact exchanger, through which the air current of the refrigeration equipment, which removes heat directly from the environment surrounding it, namely, from the inside of the container, circulates.

For the purpose of minimising the temperature of the air current at the outlet of the turbine and achieving a more efficient process, the heat exchanger and one or more components of the refrigeration equipment can be located inside the container, for example, the heat exchanger and the turbine. Optionally, in addition to the heat exchanger and the turbine, the cold part of the regenerator (part of the regenerator for cooling the air current) and the 3-way valve can be arranged inside the container.

Likewise, the heat exchanger can be located inside a vessel which is in turn located inside the container. According to this configuration, the equipment allows a maximum removal of heat from any material found inside the vessel; for example, a lunar sample required to be maintained in its original state on its way back to Earth.

Optionally, the heat exchanger is a direct contact heat exchanger, such that the actual inside of the container is the heat exchanger, in which air from the refrigeration equipment and the inside of the container come into contact, producing the heat transfer between both. Preferably, the air exits the container through a nozzle.

Optionally, the heat exchanger is a direct contact exchanger, which is formed by a wall which covers an enclosure of the container, such that a gap is generated between the enclosure and the wall of the heat exchanger. The wall of the heat exchanger is porous in one area, preferably in the ceiling. Distribution channels allow the entry of air from the refrigeration equipment into the gap between the enclosure and the wall of the exchanger. The air from the refrigeration equipment penetrates the container through the porous area, thus cooling the inside of the container. The air exits the container through outlet openings penetrating the wall of the heat exchanger and the enclosure of the container. The outlet openings are preferably located in the side walls of the enclosure of the container and in the lower part thereof.

Other possible particularities mentioned above in reference to the cooling of a coolant circulating through a refrigeration circuit can be extrapolated to the application of the invention to the cooling of a container, without departing from the scope and spirit of the present invention as a result. It is not considered necessary to explain said possible particularities again as they are sufficiently described above.

DESCRIPTION OF THE DRAWINGS

To complement the description that is being made and for the purpose of helping to better understand the features of the invention according to a preferred practical embodiment thereof, a set of drawings is attached as an integral part of said description, in which the following is depicted in an illustrative and non-limiting manner.

PREFERRED EMBODIMENTS OF THE INVENTION

The present invention relates to a refrigeration method and equipment, which uses an environmental air current as a working fluid, for cooling a coolant circulating in a refrigeration circuit (109) of a vehicle and/or of a super-charger. The present invention is also suitable for the refrigeration of other means or systems. Several embodiments in which the present invention is applied to the refrigeration of a container (120) will be explained below.

Figure 1:
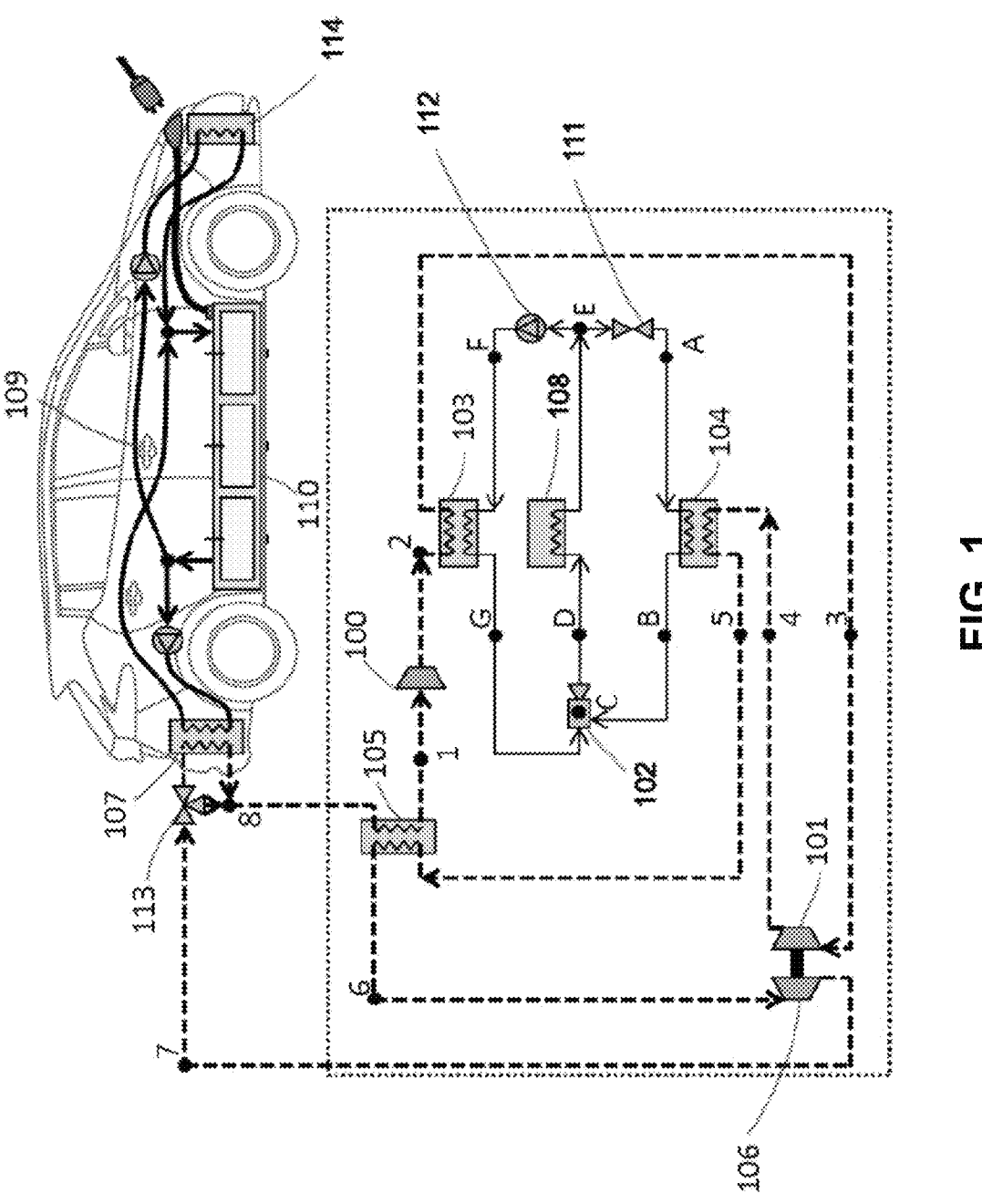
FIG. 1 shows a schematic view of an embodiment of the refrigeration equipment of the invention.

FIG. 1 shows a preferred embodiment of the refrigeration equipment of the invention, in which a reverse Brayton cycle is used to refrigerate the coolant circulating through a refrigeration circuit which surrounds the batteries and electronic components of an onboard electric or hybrid drive system in a vehicle. The equipment of FIG. 1 comprises a first compressor (100), which is preferably operated by a first electric motor, powered by an electric current. The first compressor (100) absorbs the ambient air current, which is introduced in the refrigeration equipment, and the pressure of said air current is increased due to the effect of the action of the first compressor (100). The compression of the air by means of the first compressor (100) also causes an increase in the temperature of the air current.

Once the air current has been compressed, the air current passes through a first cooler (103), which reduces the temperature of the air current, removing a specific amount of heat by heat transfer with a coolant, in this case carbon dioxide.

Once the air current has passed through the first cooler (103), it passes to a second compression step, in which a second compressor (101), operated by a turbine (106), forming a turbo generator set with the second compressor (101), increases the pressure of the air current again. Likewise, the increase in pressure in the second compressor (101) has an associated increase in temperature in the air current, so a second cooler (104) similar to the first cooler (103) is arranged to reduce the temperature of the air current.

The first cooler (103) and second cooler (104) are connected with an ejection circuit. The ejection circuit uses a coolant having a low global warming potential (GWP), to which an ejection cycle is applied. The coolant of the ejection cycle is divided into a primary flow of coolant and a secondary flow of coolant.

The primary flow of coolant is directed towards a pump (112), which increases its pressure, then it passes through the first cooler (103) which operates as a heat recovery unit of the ejection cycle, wherein it increases the thermal energy of the primary flow of coolant, which transitions to the gaseous state. This gas then circulates through the ejector (102).

On the other hand, the secondary flow of coolant is directed to a rolling valve (111). Next, it passes through the second cooler (104), which operates like an evaporator of the ejection cycle, where it isobarically increases the thermal energy of the secondary flow of coolant, which transitions to the gaseous state, and continues towards the ejector (102).

In the ejector (102), the primary flow of coolant passes through a nozzle; is accelerated, increasing it speed and reducing it pressure; and is mixed with the secondary flow of coolant, which is suctioned due to the pressure drop of the main flow, forcing the mixture of the primary and secondary flow in a coolant current having a low GWP.

The coolant current passes through a sprayer to increase the pressure of the coolant current and is directed towards a condenser (108) which isobarically reduces the thermal energy of the coolant current, such that it changes from the gas phase to the liquid phase. Then, the coolant current is directed towards a fork in which it is divided into the primary flow and the secondary flow of fluid, the ejection cycle starting again.

In a regenerator (105), the air current exiting the second cooler (104) dissipates thermal energy. The air current exiting the regenerator (105) has a much lower temperature, which is even further reduced in the expansion performed by a turbine (106) located after the regenerator (105). The turbine (106) of the invention removes energy from the current in the form of mechanical energy in the shaft of the turbine (106) and transmits said energy to the second compressor (101), such that it is not necessary to supply external energy to move said compressor.

The air exiting the turbine (106) is used to cool the coolant circulating through the refrigeration circuit (109) of the vehicle by means of an onboard heat exchanger (107) in said vehicle. The coolant thus gives off thermal energy to the air current, which increases its temperature. The air current then passes through the regenerator (105) again, where it absorbs the thermal energy given off by the air current exiting the second cooler (104).

Finally, the air current is recirculated again towards the first compressor (100).

FIG. 1 also shows that a three-way valve (113) directing the flow in two possible configurations is placed right behind the turbine (106). In a first configuration, the equipment of the invention is connected to the refrigeration circuit (109) of the vehicle through the heat exchanger (107). And in a second configuration, the equipment of the invention is not connected to the refrigeration circuit of the batteries, but rather in this case, the valve (113) is configured such that the air current exiting the turbine (106) is not directed towards the heat exchanger (107), but rather is directed to the regenerator (105) directly, skipping over said heat exchanger (107).

The second configuration allows an air current to be maintained at a low temperature with a low consumption of electrical energy, instead of having to regulate the temperature of the ambient air and of the rest of the equipment of the invention again when it is connected to the heat exchanger (107) of the refrigeration circuit (109) of batteries (110), and it returns to the first configuration.

Figure 2:
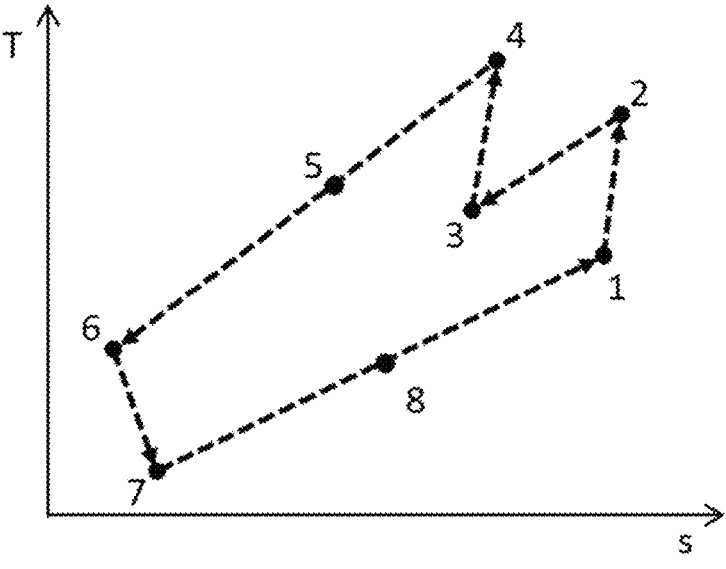
FIG. 2 shows a diagram of the reverse Brayton cycle depicting the steps of a preferred embodiment of the method of the invention.

FIG. 2 shows the diagram of the reverse Brayton cycle of the equipment shown in FIG. 1, where entropy is depicted on the y-axis and temperature is depicted on the x-axis. The diagram of the cycle furthermore depicts a preferred embodiment of the method of the invention.

Point 1 depicts the thermodynamic state of the air entering the equipment absorbed by the first compressor (100), before entering the compression step of the method of the invention, which is a compression by phases with intercalated cooling phases in the case shown in FIG. 2. The action of the first compressor (100) on the air current is shown in the line joining point 1 with point 2, such that the compressor increases the temperature, in the case if the Figure from 20 degrees centigrade to 160 degrees centigrade, and increases the entropy of the air current. The increase in temperature of the air current is due to process losses and to the thermodynamics of the process of increasing pressure, in this case from 1 bar to 2.7 bar. Said compression involves the need to introduce energy in the equipment, which in this case is preferably obtained from an electric motor.

Between point 2 and point 3, which are shown in FIG. 2, the action of the first cooler (103) is shown, which action involves a decrease in entropy and temperature of the air current at constant pressure, in this case from 160 degrees centigrade to 60 degrees centigrade. Between point 3 and 4, the second compression phase performed by the second compressor (101) occurs, the action of which compression on the fluid is similar to that of the first compressor (100), but raising the pressure to a higher level, in this case to 3 bar, the temperature being around 85 degrees centigrade. The second cooler (104) repeats the same action as the first cooler (103) and reduces the temperature of the air current, in this case from 85 degrees centigrade at point 4 to 30 degrees centigrade at point 5. Such that the overall effect of the compression and cooling phases of the compression step is an increase in pressure of 1 bar to 3 bar with an increase in temperature of 20 to 30 degrees centigrade, which is reached at point 5 of FIG. 2.

Then the air current passes to the regeneration step, whereby means of the regenerator (105) it is cooled at constant pressure from 30 degrees centigrade to 100 degrees centigrade below zero, with a decrease in entropy occurring in this process, as shown at point 6 of FIG. 2.

Next, the air current passes to the expansion step, where the turbine (106) expands the air current reducing the pressure with a high coefficient of expansion, in this case 3, and removing mechanical energy in the form of rotation from the shaft of the turbine (106). Furthermore, the expansion of the air current also causes a decrease in temperature, in this case from 100 degrees centigrade below zero to 125 degrees centigrade below zero, at point 7 of FIG. 2.

Next, the air current passes through the heat exchanger (107), where it receives thermal energy from the coolant circulating through the refrigeration circuit (109) of the batteries (110), until reaching 110 degrees centigrade below zero at point 8 of FIG. 2.

Then, the air current again passes through the regenerator (105), to receive the thermal energy given off by the air current exiting the second cooler (104). In this process, it increases the temperature of the air current until reaching 20 degrees centigrade again at point 1 of FIG. 2, at constant pressure, increasing entropy.

Figure 3:
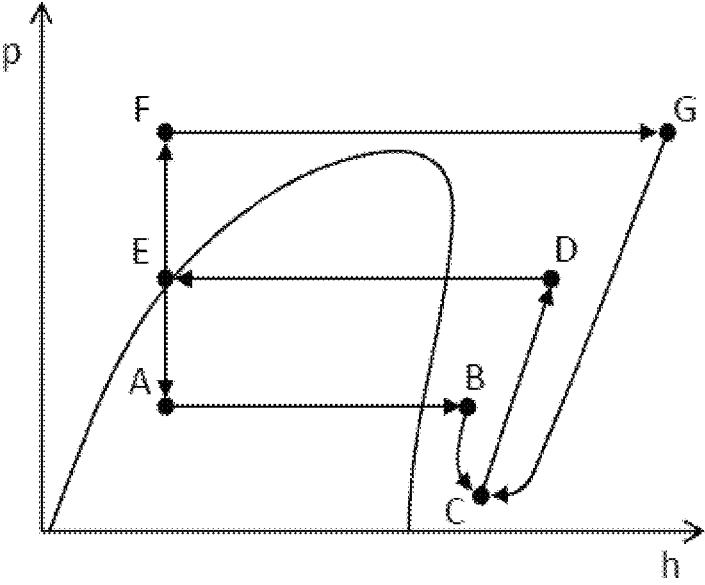
FIG. 3 shows a diagram of the ejection cycle depicting the steps of a preferred embodiment of the method of the invention.

FIG. 3 shows the diagram of the ejection cycle in which the pressure of the coolant is depicted on the x-axis and enthalpy is depicted on the y-axis. The working pressure and temperature data presented below has been obtained for the ejection cycle working with R1234yf, which is a state-of-the-art working fluid with a low environmental impact. Nevertheless, these values may change depending on the working fluid used. At point E of FIG. 3, the coolant current is divided into a primary flow of coolant and a secondary flow of coolant. The primary flow passes through a pump (112), which drives it and increases its pressure until reaching 27.7 bar at point F of FIG. 3.

Next, the primary flow passes to the first air cooler (103), which is the heat recovery unit of the ejection cycle, where it increases its temperature at a constant pressure and transitions to the gaseous state, reaching 110° C. at point G of FIG. 3. Then the primary flow is introduced in the ejector (102).

In turn, the secondary flow passes through a rolling valve (111), where a loss of pressure occurs, which causes the secondary flow of coolant to reach a pressure of 3.5 bar at point A of FIG. 3.

Then the secondary flow passes through the second cooler (104), which is the evaporator of the ejection cycle, such that it increases its thermal energy at a constant pressure and transitions to the gaseous state at point B of FIG. 3. After that the secondary flow is introduced in the ejector (102).

Inside the ejector (102), the primary flow passes through a nozzle, increasing its speed and decreasing its pressure to point C of FIG. 3. In turn, the secondary flow is suctioned towards the inside of the ejector (102) due to the pressure drop caused by the primary flow at the outlet of the nozzle, such that at point C of FIG. 3 the primary flow and the secondary are mixed, forming of new a single coolant current. This coolant current passes through a sprayer, increasing its pressure until reaching 8.3 bar at point D of FIG. 3.

After exiting the ejector (102), the coolant current passes through a condenser (108), which decreases the thermal energy of said coolant current at constant pressure to 32° C., the coolant current transitioning to the liquid state and returning to point E of FIG. 3.

Those persons skilled in the art will understand that the refrigeration equipment of the present invention is suitable not only for the ultra-rapid charging of batteries of electric or hybrid drive systems, but also for other processes requiring refrigeration. By performing the same aforementioned functions, the equipment of the present invention allows a very low-temperature air current to be obtained after passing through the turbine (106). This very low-temperature air current allows a large amount of thermal energy to be removed from any means or system which requires refrigeration, regardless of the nature thereof. The equipment of the present invention can be for cooling systems or means such as, for example, refrigeration containers, cryogenisation chambers, etc., for its application in different processes, for example, in the preservation of temperature-sensitive material, such as vaccines, pharmaceutical products, samples, chemicals, foodstuffs, in cryogenisation processes, in wound treatment, etc.

Several embodiments corresponding to the application of the present invention to the refrigeration of a container (120) are set forth below.

Figure 4:
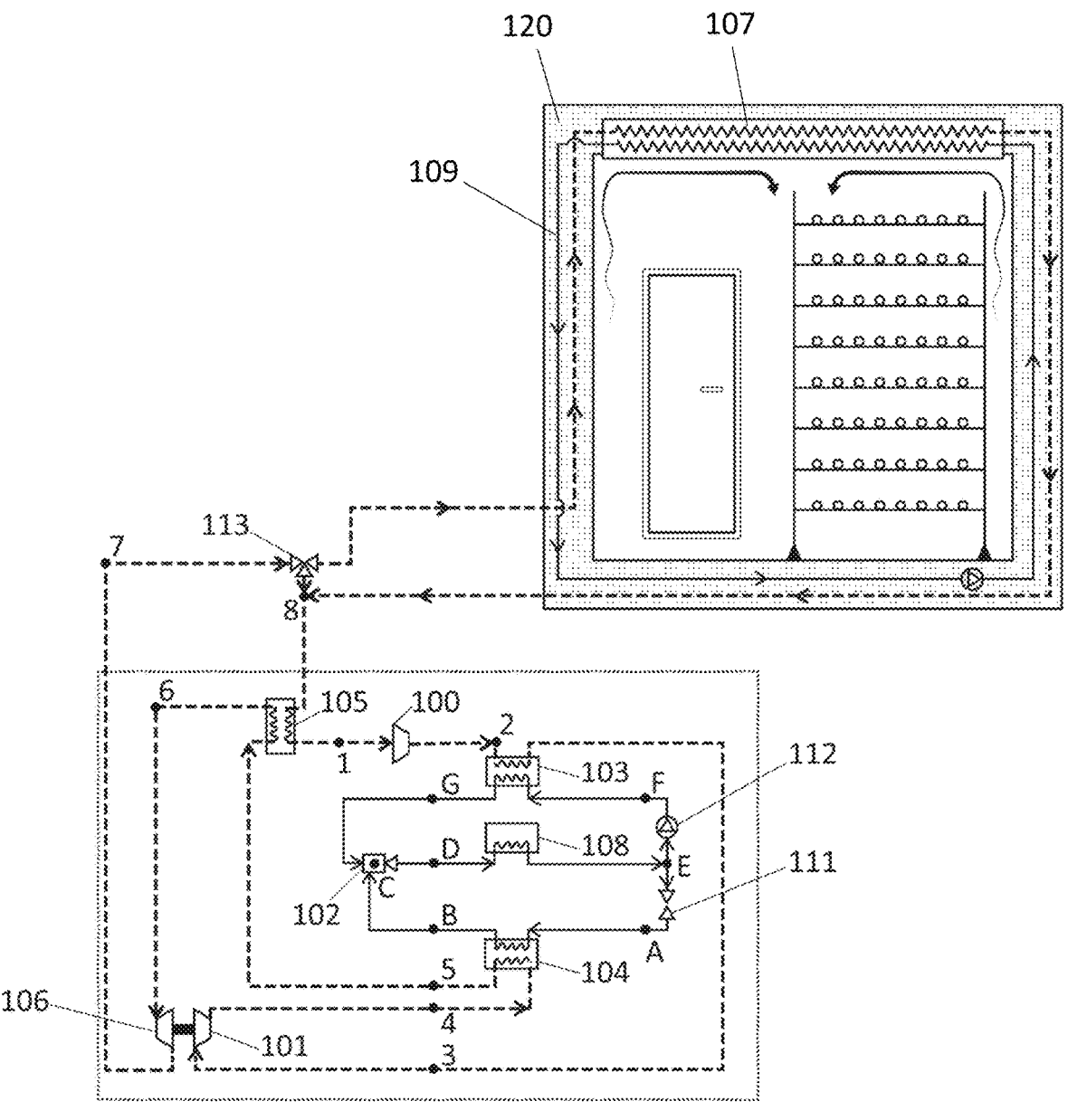
FIG. 4 shows a schematic view of another embodiment of the refrigeration equipment of the invention, applied to the refrigeration of a container.
Figure 5:
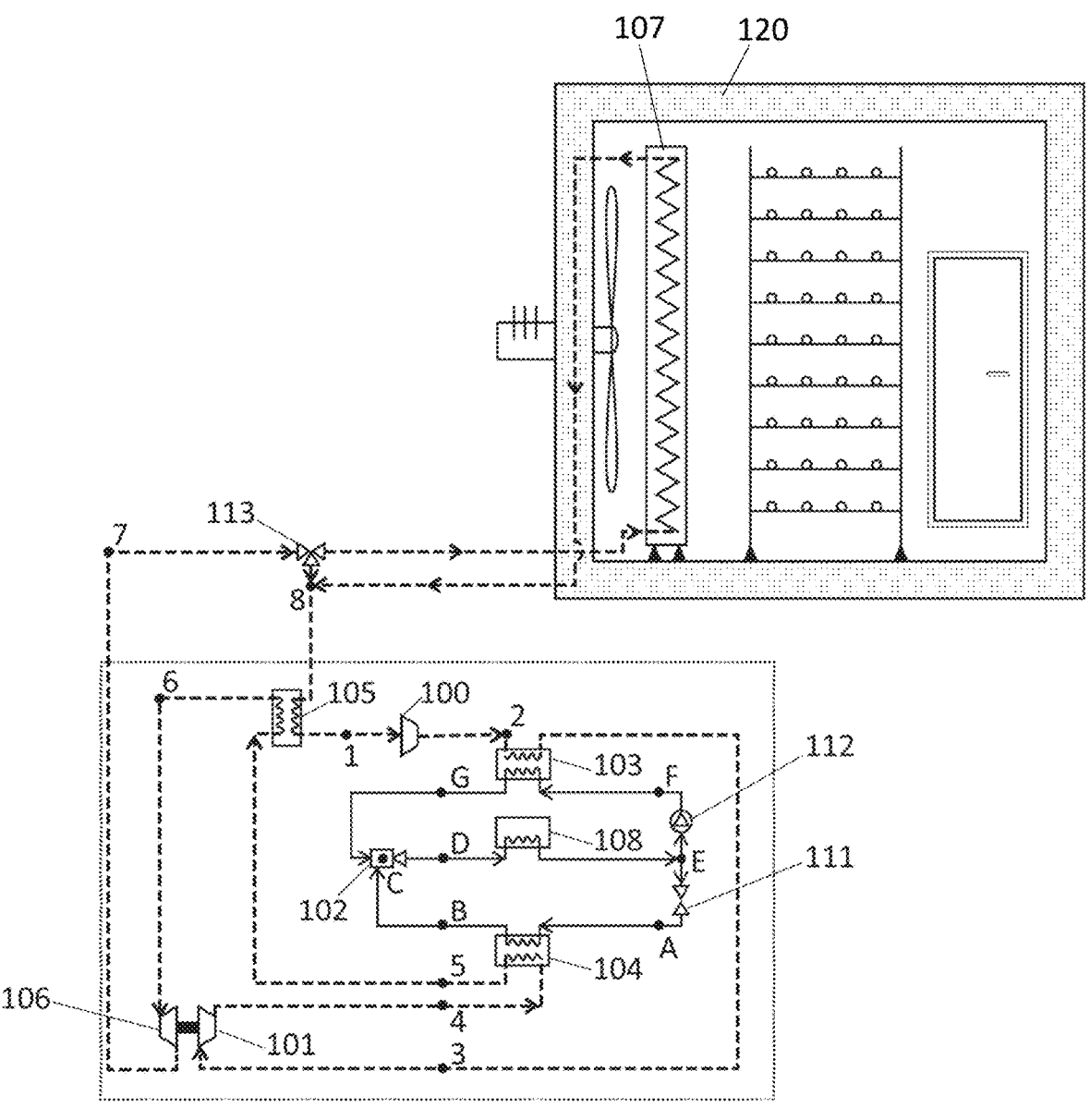
FIG. 5 shows a schematic view of another embodiment of the refrigeration equipment of the invention, applied to the refrigeration of a container.

FIG. 4 shows a preferred embodiment of the refrigeration equipment of the invention, in which a reverse Brayton cycle is used to refrigerate the inside of the container (120).

The refrigeration equipment uses an air current as a working fluid, for cooling a coolant circulating in a refrigeration circuit (109) of the container (120).

Preferably, the container (120) comprises an outer enclosure with two (inner and outer) walls separated by insulating material, such that inside same (between the inner and outer walls) the coolant in an innermost layer and return air to the refrigeration equipment in an outermost layer circulate in counter-current.

The equipment of FIG. 4 comprises a first compressor (100), which is preferably operated by a first electric motor, powered by an electric current. The first compressor (100) absorbs the air current, which is introduced in the refrigeration equipment, and the pressure of said air current is increased due to the effect of the action of the first compressor (100). The compression of the air by means of the first compressor (100) also causes an increase in the temperature of the air current.

Once the air current has been compressed, the air current passes through a first cooler (103), which reduces the temperature of the air current, removing a specific amount of heat by heat transfer with a coolant, in this case carbon dioxide.

Once the air current has passed through the first cooler (103), it passes to a second compression step, in which a second compressor (101), operated by a turbine (106), forming a turbo generator set with the second compressor (101), increases the pressure of the air current again. Likewise, the increase in pressure in the second compressor (101) has an associated increase in temperature in the air current, so a second cooler (104) similar to the first cooler (103) is arranged to reduce the temperature of the air current.

The first cooler (103) and second cooler (104) are connected with an ejection circuit. The ejection circuit uses a coolant having a low global warming potential (GWP), to which an ejection cycle is applied. The coolant of the ejection cycle is divided into a primary flow of coolant and a secondary flow of coolant.

The primary flow of coolant is directed towards a pump (112), which increases its pressure, then it passes through the first cooler (103) which operates as a heat recovery unit of the ejection cycle, wherein it increases the thermal energy of the primary flow of coolant, which transitions to the gaseous state. This gas then circulates through the ejector (102).

On the other hand, the secondary flow of coolant is directed to a rolling valve (111). Next, it passes through the second cooler (104), which operates like an evaporator of the ejection cycle, where it isobarically increases the thermal energy of the secondary flow of coolant, which transitions to the gaseous state, and continues towards the ejector (102).

In the ejector (102), the primary flow of coolant passes through a nozzle; is accelerated, increasing it speed and reducing it pressure; and is mixed with the secondary flow of coolant, which is suctioned due to the pressure drop of the main flow, forcing the mixture of the primary and secondary flow in a coolant current having a low GWP.

The coolant current passes through a sprayer to increase the pressure of the coolant current and is directed towards a condenser (108) which isobarically reduces the thermal energy of the coolant current, such that it changes from the gas phase to the liquid phase. Then, the coolant current is directed towards a fork in which it is divided into the primary flow and the secondary flow of fluid, starting the ejection cycle again.

In a regenerator (105), the air current exiting the second cooler (104) dissipates thermal energy. The air current exiting the regenerator (105) has a much lower temperature, which is even further reduced in the expansion performed by a turbine (106) located after the regenerator (105). The turbine (106) of the invention removes energy from the current in the form of mechanical energy in the shaft of turbine (106) and transmits said energy to the second compressor (101), such that it is not necessary to supply external energy to move said compressor.

The air exiting the turbine (106) is used for cooling the coolant circulating through the refrigeration circuit (109) of the container (120) by means of a heat exchanger (107) arranged in the container (120). The heat exchanger (107) is an indirect contact exchanger, preferably a plate or shell and tube type exchanger. Preferably, the coolant is of glycol water type which is always liquid at the operating temperatures. The coolant thus gives off thermal energy to the air current by forced convection, which increases its temperature. The air current then passes through the regenerator (105) again, where it absorbs the thermal energy given off by the air current exiting the second cooler (104). The coolant moves, as a result of a pump, through the inside of the enclosure (between the inner and outer walls) of the container (120). The main exchange with the inside of the container (120) occurs in the heat exchanger (107) by means of radiation and natural convection between the coolant and the inside of the container (120). Preferably, the heat exchanger (107) is located in the ceiling of the container (120), thus favouring natural convection, such that the thermal currents which cause the air heated by the loading inside the container (120) to rise are cooled in the heat exchanger (107) and drop down again to the floor of the container (120).

After the heat transfer in the heat exchanger (107), the air current is finally recirculated again towards the first compressor (100), preferably through the inside of the enclosure (between the inner and outer walls) of the container (120), through a more outer layer than the refrigeration circuit (109) of the container.

FIG. 4 also shows that a three-way valve (113) directing the flow in two possible configurations is placed right behind the turbine (106). A first configuration in which the equipment of the invention is connected to a refrigeration circuit (109) of the container (120) through the heat exchanger (107). And in a second configuration, the equipment of the invention is not connected to the refrigeration circuit (109) of the container (120), but rather in this case, the three-way valve (113) is configured such that the air current exiting the turbine (106) is not directed towards the heat exchanger (107), but rather is directed to the regenerator (105) directly, skipping over said heat exchanger (107).

The second configuration allows an air current to be maintained at a low temperature with a low consumption of electrical energy, instead of having to regulate the temperature of the air and of the rest of the equipment of the invention again when it is connected to the heat exchanger (107) of the refrigeration circuit (109) of the container (120), and it returns to the first configuration.

FIG. 2 shows the diagram of the reverse Brayton cycle of the equipment shown in FIG. 4, where entropy is depicted on the y-axis and temperature is depicted on the x-axis. The diagram of the cycle furthermore depicts a preferred embodiment of the method of the invention.

Point 1 depicts the thermodynamic state of the air entering the equipment absorbed by the first compressor (100), before entering the compression step of the method of the invention, which is a compression by phases with intercalated cooling phases in the case shown in FIG. 2. The action of the first compressor (100) on the air current is shown in the line joining point 1 with point 2, such that the compressor increases the temperature, in the case if the Figure from 20 degrees centigrade to 160 degrees centigrade, and increases the entropy of the air current. The increase in temperature of the air current is due to process losses and to the thermodynamics of the process of increasing pressure, in this case from 1 bar to 2.7 bar. Said compression involves the need to introduce energy in the equipment, which in this case is preferably obtained from an electric motor.

Between point 2 and point 3, which are shown in FIG. 2, the action of the first cooler (103) is shown, which action involves a decrease in entropy and temperature of the air current at constant pressure, in this case from 160 degrees centigrade to 60 degrees centigrade. Between point 3 and 4, the second compression phase performed by the second compressor (101) occurs, the action of which compression on the fluid is similar to that of the first compressor (100), but raising the pressure to a higher level, in this case to 3 bar, the temperature being around 85 degrees centigrade. The second cooler (104) repeats the same action as the first cooler (103) and reduces the temperature of the air current, in this case from 85 degrees centigrade at point 4 to 30 degrees centigrade at point 5. Such that the overall effect of the compression and cooling phases of the compression step is an increase in pressure of 1 bar to 3 bar with an increase in temperature of 20 to 30 degrees centigrade, which is reached at point 5 of FIG. 2.

Then the air current passes to the regeneration step, whereby means of the regenerator (105) it is cooled at constant pressure from 30 degrees centigrade to 100 degrees centigrade below zero, with a decrease in entropy occurring in this process, as shown at point 6 of FIG. 2.

Next, the air current passes to the expansion step, where the turbine (106) expands the air current reducing the pressure with a high coefficient of expansion, in this case 3, and removing mechanical energy in the form of rotation from the shaft of the turbine (106). Furthermore, the expansion of the air current also causes a decrease in temperature, in this case from 100 degrees centigrade below zero to 125 degrees centigrade below zero, at point 7 of FIG. 2.

Next, the air current passes through the heat exchanger (107), where it receives thermal energy from the coolant circulating through the refrigeration circuit (109) of the container (120), until reaching 110 degrees centigrade below zero at point 8 of FIG. 2.

Then, the air current again passes through the regenerator (105), to receive the thermal energy given off by the air current exiting the second cooler (104). In this process, it increases the temperature of the air current until reaching 20 degrees centigrade again at point 1 of FIG. 2, at constant pressure, increasing entropy.

FIG. 3 shows the diagram of the ejection cycle in which the pressure of the coolant is depicted on the x-axis and enthalpy is depicted on the y-axis. The working pressure and temperature data presented below has been obtained for the ejection cycle working with R1234yf, which is a state-of-the-art working fluid with a low environmental impact. Nevertheless, these values may change depending on the working fluid used. At point E of FIG. 3, the coolant current is divided into a primary flow of coolant and a secondary flow of coolant. The primary flow passes through a pump (112), which drives it and increases its pressure until reaching 27.7 bar at point F of FIG. 3.

Next, the primary flow passes to the first air cooler (103), which is the heat recovery unit of the ejection cycle, where it increases its temperature at a constant pressure and transitions to the gaseous state, reaching 110° C. at point G of FIG. 3. Then the primary flow is introduced in the ejector (102).

In turn, the secondary flow passes through a rolling valve (111), where a loss of pressure occurs, which causes the secondary flow of coolant to reach a pressure of 3.5 bar at point A of FIG. 3.

Then the secondary flow passes through the second cooler (104), which is the evaporator of the ejection cycle, such that it increases its thermal energy at a constant pressure and transitions to the gaseous state at point B of FIG. 3. After that the secondary flow is introduced in the ejector (102).

Inside the ejector (102), the primary flow passes through a nozzle, increasing its speed and decreasing its pressure to point C of FIG. 3. In turn, the secondary flow is suctioned towards the inside of the ejector (102) due to the pressure drop caused by the primary flow at the outlet of the nozzle, such that at point C of FIG. 3 the primary flow and the secondary are mixed, forming of new a single coolant current. This coolant current passes through a sprayer increasing its pressure until reaching 8.3 bar at point D of FIG. 3.

After exiting the ejector (102), the coolant current passes through a condenser (108), which decreases the thermal energy of said coolant current at constant pressure to 32° C., the coolant current transitioning to the liquid state and returning to point E of FIG. 3.

Figure 8:
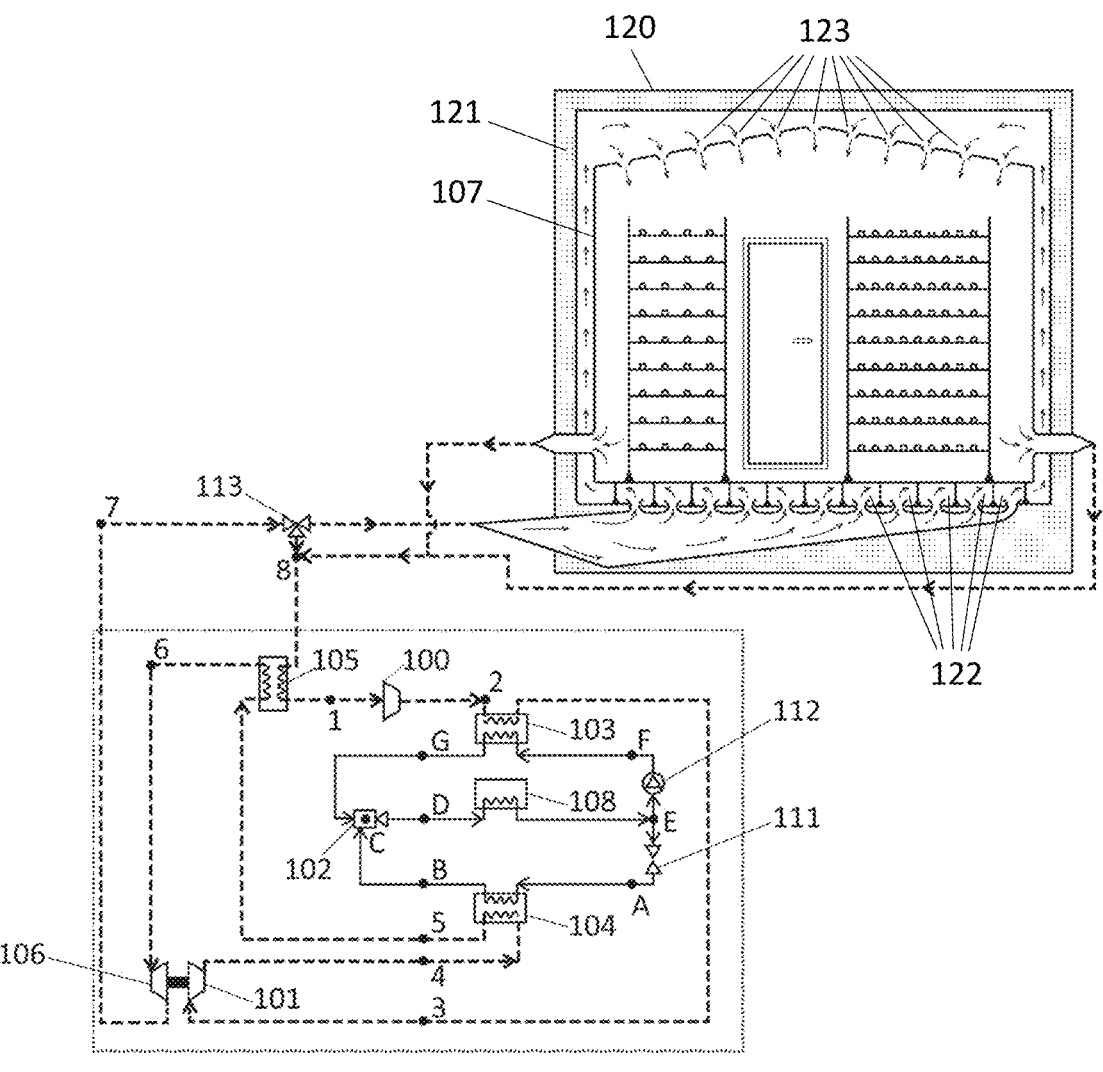
FIG. 8 shows a schematic view of another embodiment of the refrigeration equipment of the invention, applied to the refrigeration of a container.

According to another preferred embodiment shown in FIG. 8, the heat exchanger (107) is a direct contact exchanger, which is formed by a wall which covers the enclosure (121) of the container (120), such that a gap is generated between the enclosure (121) and the wall of the heat exchanger (107). Said wall is porous in the ceiling and is leak-tight in the floor and in the sides. The air of the refrigeration equipment enters the container (120) through its floor, going through the outer and inner walls, through distribution channels (122) communicating the refrigeration equipment with the gap existing between the enclosure container (120) and the wall forming the heat exchanger (107). The cold air of the equipment rises up through the gap by thermal diffusion and by convective transport due to the pressure of the first compressor (100) and of the second compressor (101). The air from the refrigeration equipment penetrates the container (120) through the porous area (123), thus cooling the inside of the container. Preferably, access to the container (120) on the outside is located in the centre and the distributed load on the sides of the access. Preferably, the container (120) has an access on the outside in the centre and has a load (material to be refrigerated) distributed on the sides of the access. The refrigeration of the thermal load occurs by forced convection of the air cold and by radiation from the floors, walls and ceiling. The air exits the container (120) through side outlet openings located in the lower part of the container, penetrating the wall of the heat exchanger (107) and the enclosure (121) of the container (120). The reheated air returns to the regenerator (105). Preferably, the enclosure (121) comprises two (inner and outer) walls between which there is insulating material to prevent the entry of heat.

Figure 6:
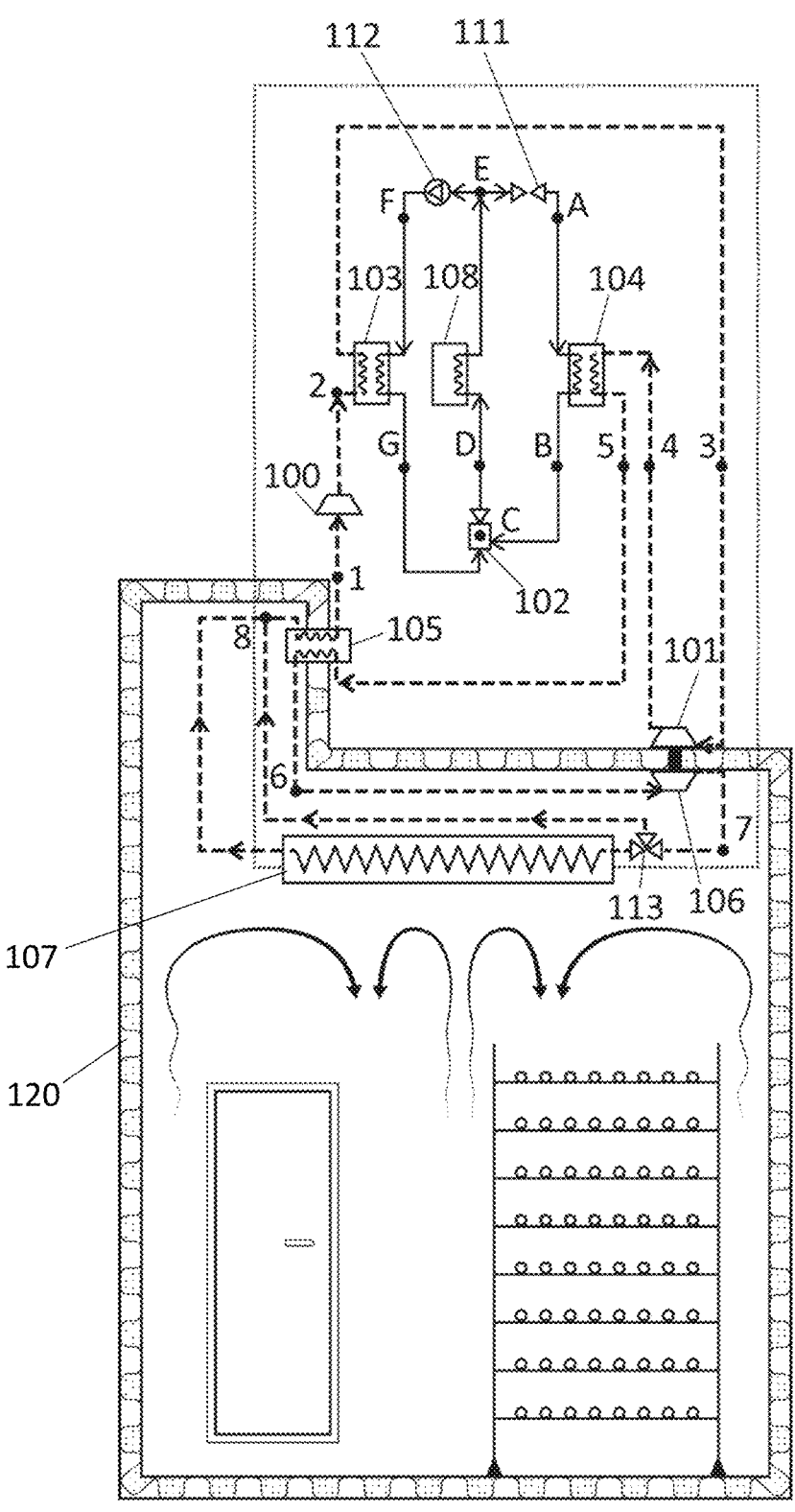
FIG. 6 shows a schematic view of another embodiment of the refrigeration equipment of the invention, applied to the refrigeration of a container.

For the purpose of minimising the temperature of the air current at the outlet of the turbine (106) and achieving a more efficient process, according to another preferred embodiment shown in FIG. 6, the heat exchanger (107) and one or more components of the equipment can be located inside the container (120). Preferably, the heat exchanger (107), the turbine (106), the cold part of the regenerator (105) (part of the regenerator for cooling the air current) and the 3-way valve are arranged inside the container (120). The rest of the components of the equipment are located on the outside of the container (120). The heat exchanger (107) is an indirect contact exchanger, through which the air current of the refrigeration equipment, which removes heat from inside the container, circulates. The heat exchanger (107) exchanges heat with the thermal load inside the container (120) by natural convection and by radiation. Preferably, the container (120) comprises an outer enclosure with two (inner and outer) walls between which there is insulating material to prevent the entry of heat.

Figure 7:
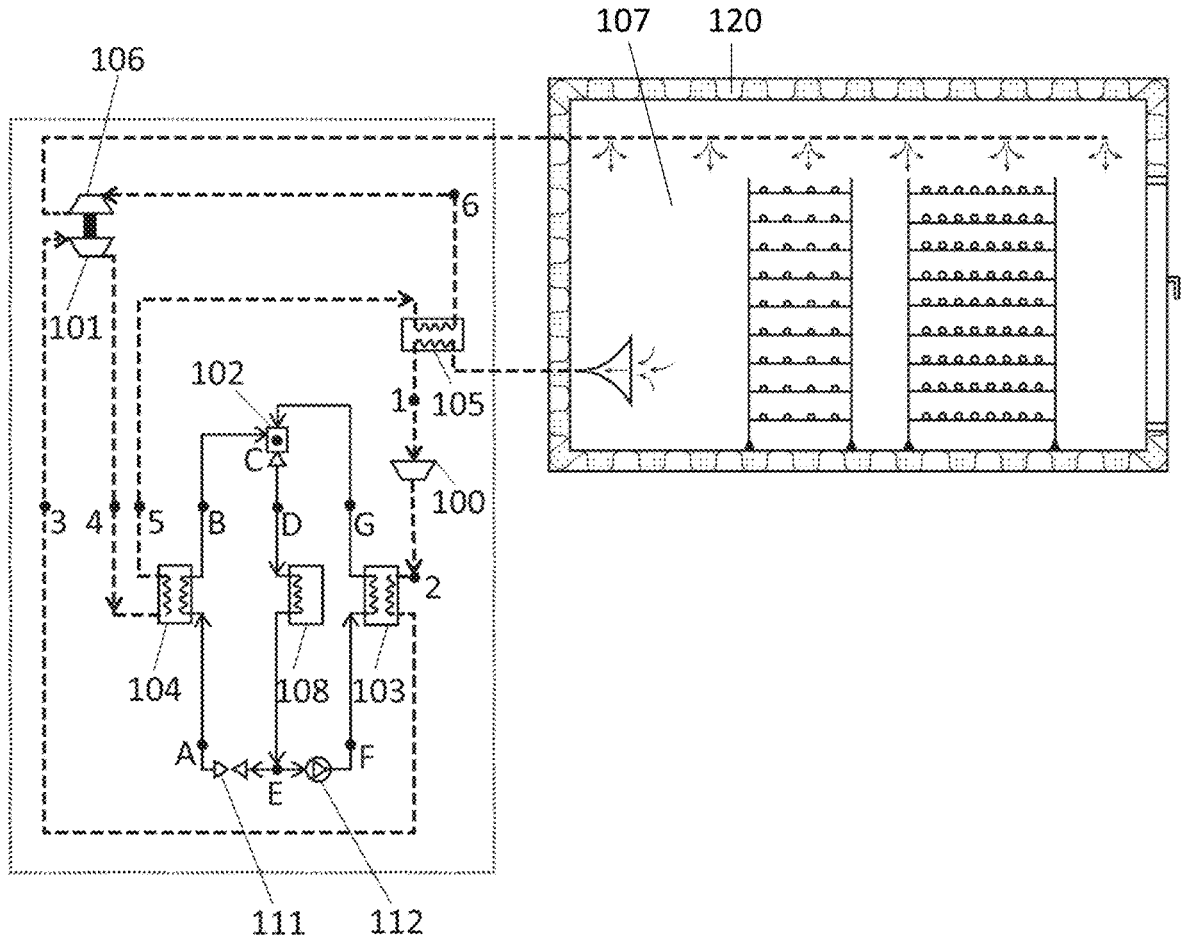
FIG. 7 shows a schematic view of another embodiment of the refrigeration equipment of the invention, applied to the refrigeration of a container.

According to another preferred embodiment shown in FIG. 7, the heat exchanger (107) is a direct contact heat exchanger, such that the actual inside of the container (120) is the heat exchanger (107), in which air from the refrigeration equipment and the inside of the container come into contact, producing the heat transfer between both. The air of the refrigeration equipment is preferably distributed by a distribution conduit which uniformly distributes it through the ceiling of the container (120). The air exchanges heat with the thermal load of the container (120) by forced convection. The reheated air exits the container (120) through a nozzle located at the end opposite of an access of the container (120) so as not to interfere with the openings thereof or with the refilling; and to facilitate attaching pre-chambers or other compartments to same. Preferably, the container (120) comprises an outer enclosure with two (inner and outer) walls between which there is insulating material to prevent the entry of heat.

According to another preferred embodiment shown in FIG. 8, the heat exchanger (107) is a direct contact exchanger, which is formed by a wall which covers the enclosure of the container (120), such that a gap is generated between the enclosure and the wall of the heat exchanger (107). Said wall is porous in the ceiling and is leak-tight in the floor and in the sides. The air of the refrigeration equipment enters the container (120) through its floor, going through the outer and inner walls, through distribution channels communicating the refrigeration equipment with the gap existing between the enclosure container (120) and the wall forming the heat exchanger (107). The cold air of the equipment rises up through the gap by thermal diffusion and by convective transport due to the pressure of the first compressor (100) and of the second compressor (101). The air from the refrigeration equipment penetrates the container (120) through the porous area, thus cooling the inside of the container. Preferably, access to the container (120) on the outside is located in the centre and the distributed load on the sides of the access. Preferably, the container (120) has an access on the outside in the centre and has a load (material to be refrigerated) distributed on the sides of the access. The refrigeration of the thermal load occurs by forced convection of the air cold and by radiation from the floors, walls and ceiling. The air exits the container (120) through side outlet openings located in the lower part of the container, penetrating the wall of the heat exchanger (107) and the enclosure of the container (120). The reheated air returns to the regenerator (105). Preferably, the enclosure comprises two (inner and outer) walls between which there is insulating material to prevent the entry of heat.

According to another embodiment particular, the heat exchanger (107) is located inside a vessel which is in turn located inside the container (120). According to this configuration, the equipment allows a maximum removal of heat from any material found inside the vessel; for example, a lunar sample required to be maintained in its original state on its way back to Earth.

As set forth above, the equipment of the invention allows air to be generated at a very low temperature, to continuously cool the inside of the container (120). The equipment of the invention allows a very high refrigeration power to be obtained without needing to increase the size of the equipment. Depending on the characteristics of the components of the equipment, temperatures of −200° C. can be achieved for the air current upon exiting the turbine (106), such that the inside of the container (120) and any material located therein can be refrigerated at temperatures of −110 degrees ° C.

Although the present invention has been described in reference to preferred embodiments thereof, those skilled in the art may make modifications and variations to the above teachings without departing from the scope and spirit of the present invention as a result.

The invention claimed is:

1. A refrigeration equipment for cooling the inside of a container, which uses an air current as a working fluid and comprises:

at least one first compressor, configured to absorb air and increase the pressure thereof, producing a compressed air current;

a regenerator, connected with the first compressor, to receive the compressed air current;

a turbine, connected with the regenerator, to receive the air current of the regenerator and produce and expansion of this air current;

a heat exchanger, connected with the turbine, with the inside of the container and with the regenerator, to receive the air current expanded in the turbine, to allow the heat transfer between the inside of the container and said expanded air current, and then deliver the air current to the regenerator, which recirculates it towards the first compressor;

at least one second compressor, configured to absorb air from a first cooler and increase the pressure thereof;

at least one second cooler, connected to the second compressor and to the regenerator, to reduce the temperature of the air current compressed by the second compressor and deliver it to the regenerator;

an ejection cycle comprising:

a pump, to direct a primary flow of coolant in liquid state towards the first cooler, to receive thermal energy of the air current, such that the coolant in liquid state transitions to a gaseous state, a rolling valve, to direct a secondary flow of coolant in liquid state towards the second cooler, to receive thermal energy of the air current, such that the coolant transitions to a gaseous state, an ejector comprising a nozzle which receives the primary flow of coolant in gaseous state of the first cooler and accelerates said primary flow of coolant in gaseous state to the mixing area, an intake connected to the second cooler to receive the secondary flow in gaseous state, which is suctioned towards the mixing area of the ejector due to the pressure drop of the main flow, the primary and second flow of coolant mixed into a single coolant current; and a sprayer throttling back and increasing the pressure of the coolant current at the outlet of the ejector, a condenser which reduces the temperature of the coolant current such that it changes from the gas phase to the liquid phase, and a flow divider, to divide the condensed coolant current, directing the primary flow towards the pump and the secondary flow towards the rolling valve;

a three-way valve connected to the turbine, such that upon activation it redirects the air exiting the turbine directly towards the regenerator without previously passing through the heat exchanger, wherein the turbine is mechanically connected to the second compressor, such that the turbine transfers mechanical energy thereto, wherein the regenerator receives the compressed air current of the first compressor, to reduce the temperature thereof, and the air current of the heat exchanger, to heat it by means of heat exchange between both, wherein the first cooler is connected to the first compressor and assigned to reduce the temperature of the air current compressed by the first compressor, and wherein the first cooler operates with a coolant selected from ammonia or carbon dioxide.

2. The equipment according to claim 1, wherein the second cooler operates with a coolant selected from ammonia or carbon dioxide.

3. The equipment according to claim 1, wherein the heat exchanger is an indirect contact exchanger, and the air current from the refrigeration equipment and a coolant of the container circulate through same; such that the coolant circulates through a refrigeration circuit which removes heat from inside the container, and the air current of the refrigeration equipment in turn removes heat from the coolant.

4. The equipment according to claim 1, wherein the heat exchanger is an indirect contact exchanger, through which the air current of the refrigeration equipment, which removes heat directly from inside the container, circulates.

5. The equipment according to claim 1, wherein in addition to the heat exchanger, one or more components of the equipment are located inside the container.

6. The equipment according to claim 1, wherein the heat exchanger is a direct contact heat exchanger, such that the actual inside of the container is the heat exchanger, in which air from the refrigeration equipment and the inside of the container come into contact, producing the heat transfer between both.

7. The equipment according to claim 1, wherein the heat exchanger is a direct contact heat exchanger and is formed by a wall which covers an enclosure of the container, generating a gap between the enclosure and the wall of the heat exchanger; such that distribution channels allow the entry of air from the refrigeration equipment into the gap between the enclosure and the wall of the exchanger, the air penetrating the container through a porous area of the wall of the heat exchanger, to cool the inside of the container.

8. A refrigeration method for cooling the inside of a container, which uses an air current as a working fluid and comprises the steps of:

a. compressing, to increase the pressure of the air current, b. expanding, to reduce the temperature of the previously compressed air current, at the same time that mechanical energy is obtained by means of reducing the pressure of said air current, c. refrigerating, to allow an exchange of thermal energy between the air current resulting from the expansion step and the inside of the container, and d. regenerating, to allow an exchange of thermal energy between the air current resulting from the compression step and the air current resulting from the refrigeration step, increasing the temperature of the air current resulting from the refrigeration step and reducing the temperature of the current resulting from the compression step;

the method further comprising:

directing a primary flow of coolant in liquid state towards a first cooler, to receive thermal energy of the air current, such that the coolant in liquid state transitions to a gaseous state;

directing a secondary flow of coolant in liquid state towards a second cooler, to receive thermal energy of the air current, such that the coolant transitions to a gaseous state;

mixing the primary and second flow of coolant into a single coolant current;

throttling back and increasing the pressure of the coolant current; and reducing the temperature of the coolant current such that it changes from the gas phase to the liquid phase, wherein the method is performed using a refrigeration equipment comprising:

at least one first compressor, configured to absorb air and increase the pressure thereof, producing a compressed air current;

a regenerator, connected with the first compressor, to receive the compressed air current;

a turbine, connected with the regenerator, to receive the air current of the regenerator and produce and expansion of this air current;

a heat exchanger, connected with the turbine, with the inside of the container and with the regenerator, to receive the air current expanded in the turbine, to allow the heat transfer between the inside of the container and said expanded air current, and then deliver the air current to the regenerator, which recirculates it towards the first compressor;

at least one second compressor, configured to absorb air from a first cooler and increase the pressure thereof;

at least one second cooler, connected to the second compressor and to the regenerator, to reduce the temperature of the air current compressed by the second compressor and deliver it to the regenerator;

an ejection cycle comprising:

a pump, to direct a primary flow of coolant in liquid state towards the first cooler, to receive thermal energy of the air current, such that the coolant in liquid state transitions to a gaseous state, a rolling valve, to direct a secondary flow of coolant in liquid state towards the second cooler, to receive thermal energy of the air current, such that the coolant transitions to a gaseous state, an ejector comprising a nozzle which receives the primary flow of coolant in gaseous state of the first cooler and accelerates said primary flow of coolant in gaseous state to the mixing area, an intake connected to the second cooler to receive the secondary flow in gaseous state, which is suctioned towards the mixing area of the ejector due to the pressure drop of the main flow, the primary and second flow of coolant mixed into a single coolant current; and a sprayer throttling back and increasing the pressure of the coolant current at the outlet of the ejector, a condenser which reduces the temperature of the coolant current such that it changes from the gas phase to the liquid phase, and a flow divider, to divide the condensed coolant current, directing the primary flow towards the pump and the secondary flow towards the rolling valve;

a three-way valve connected to the turbine, such that upon activation it redirects the air exiting the turbine directly towards the regenerator without previously passing through the heat exchanger, wherein the turbine is mechanically connected to the second compressor, such that the turbine transfers mechanical energy thereto, wherein the regenerator receives the compressed air current of the first compressor, to reduce the temperature thereof, and the air current of the heat exchanger, to heat it by means of heat exchange between both, wherein the first cooler is connected to the first compressor and assigned to reduce the temperature of the air current compressed by the first compressor, and wherein the first cooler operates with a coolant selected from ammonia or carbon dioxide.

9. The refrigeration method according to claim 8, wherein the compression step is performed in phases, alternating a compression phase with a cooling phase of the working air, in which one or more coolers remove heat from the air current.

10. The refrigeration method according to claim 9, wherein the cooling phase comprises the use of at least two coolers connected with an ejection circuit, in which the coolers operate like a heat recovery unit or an evaporator.

11. A refrigeration method for the ultra-rapid charging of batteries of electric or hybrid drive systems for cooling a coolant circulating through a refrigeration circuit which surrounds batteries and electronic components of a vehicle with an electric or hybrid drive system, and/or through a refrigeration circuit of a supercharger for the batteries of the drive system, which uses an environmental air current as a working fluid and comprising the steps of:

a. compressing, to increase the pressure of the air current, b. expanding, to reduce the temperature of the previously compressed air current, at the same time that mechanical energy is obtained by means of reducing the pressure of said air current, c. refrigerating, to allow an exchange of thermal energy between the air current resulting from the expansion step and the coolant of the refrigeration circuit, and d. regenerating, to allow an exchange of thermal energy between the air current resulting from the compression step and the air current resulting from the refrigeration step, increasing the temperature of the air current resulting from the refrigeration step and reducing the temperature of the current resulting from the compression step;

the method further comprising:

directing a primary flow of coolant in liquid state towards a first cooler, to receive thermal energy of the air current, such that the coolant in liquid state transitions to a gaseous state;

directing a secondary flow of coolant in liquid state towards a second cooler, to receive thermal energy of the air current, such that the coolant transitions to a gaseous state;

mixing the primary and second flow of coolant into a single coolant current;

throttling back and increasing the pressure of the coolant current; and reducing the temperature of the coolant current such that it changes from the gas phase to the liquid phase, wherein the method is performed using a refrigeration equipment comprising:

at least one first compressor, configured to absorb ambient air and increase the pressure thereof, producing a compressed air current;

a regenerator, connected with the first compressor, to receive the compressed air current;

a turbine, connected with the regenerator, to receive the air current of the regenerator and produce an expansion of this air current;

a heat exchanger, connected with the turbine, with the refrigeration circuit and with the regenerator, to receive the air current expanded in the turbine, to allow the heat transfer between the coolant of the refrigeration circuit and said expanded air current, and then deliver the air current to the regenerator, which recirculates it towards the first compressor;

an ejection cycle comprising:

a pump, to direct a primary flow of coolant in liquid state towards the first cooler, to receive thermal energy of the air current, such that the coolant in liquid state transitions to a gaseous state, a rolling valve, to direct a secondary flow of coolant in liquid state towards the second cooler, to receive thermal energy of the air current, such that the coolant transitions to a gaseous state, an ejector comprising a nozzle which receives the primary flow of coolant in gaseous state of the first cooler and accelerates said primary flow of coolant in gaseous state to the mixing area, an intake connected to the second cooler to receive the secondary flow in gaseous state, which is suctioned towards the mixing area of the ejector due to the pressure drop of the main flow, the primary and secondary flow of coolant mixed into a single coolant current; and a sprayer throttling back and increasing the pressure of the coolant current at the outlet of the ejector, a condenser which reduces the temperature of the coolant current such that the coolant changes from the gas phase to the liquid phase, and a flow divider, to divide the condensed coolant current, directing the primary flow towards the pump and the secondary flow towards the rolling valve;

a 3-way valve connected to the turbine, such that upon activation air is redirected exiting the turbine directly towards the regenerator without previously passing through the heat exchanger;

wherein the regenerator receives the compressed air current of the first compressor, to reduce the temperature thereof, and the air current of the heat exchanger, to heat it by means of heat exchange between both;

wherein the first cooler is connected to the first compressor and intended to reduce the temperature of the air current compressed by the first compressor; and wherein the equipment further comprises:

at least one second compressor, configured to absorb air from the first cooler and increase the pressure thereof, and at least one second cooler, connected to the second compressor and to the regenerator, to reduce the temperature of the air current compressed by the second compressor and deliver it to the regenerator, wherein the turbine is mechanically connected to the second compressor, such that it transfers mechanical energy thereto, and characterised in that the first cooler and the second cooler operate with a coolant selected from ammonia or carbon dioxide.

12. The refrigeration method according to claim 11, wherein the compression step is performed in phases, alternating a compression phase with a cooling phase of the working air, in which one or more coolers remove heat from the air current.

13. The refrigeration method according to claim 12, wherein the cooling phase comprises the use of at least two coolers connected with an ejection circuit, in which the coolers operate like a heat recovery unit or an evaporator.

14. A refrigeration equipment for the ultra-rapid charging of batteries of electric or hybrid drive systems for cooling a coolant circulating through a refrigeration circuit which surrounds batteries and electronic components of a vehicle with an electric or hybrid drive system, and/or through a refrigeration circuit of a supercharger for the batteries of the drive system, which uses an environmental air current as a working fluid and comprises:

at least one first compressor, configured to absorb ambient air and increase the pressure thereof, producing a compressed air current;

a regenerator, connected with the first compressor, to receive the compressed air current;

a turbine, connected with the regenerator, to receive the air current of the regenerator and produce an expansion of this air current;

a heat exchanger, connected with the turbine, with the refrigeration circuit and with the regenerator, to receive the air current expanded in the turbine, to allow the heat transfer between the coolant of the refrigeration circuit and said expanded air current, and then deliver the air current to the regenerator, which recirculates it towards the first compressor;

an ejection cycle comprising:

a pump, to direct a primary flow of coolant in liquid state towards the first cooler, to receive thermal energy of the air current, such that the coolant in liquid state transitions to a gaseous state, a rolling valve, to direct a secondary flow of coolant in liquid state towards the second cooler, to receive thermal energy of the air current, such that the coolant transitions to a gaseous state, an ejector comprising a nozzle which receives the primary flow of coolant in gaseous state of the first cooler and accelerates said primary flow of coolant in gaseous state to the mixing area, an intake connected to the second cooler to receive the secondary flow in gaseous state, which is suctioned towards the mixing area of the ejector due to the pressure drop of the main flow, the primary and secondary flow of coolant mixed into a single coolant current; and a sprayer throttling back and increasing the pressure of the coolant current at the outlet of the ejector, a condenser which reduces the temperature of the coolant current such that the coolant changes from the gas phase to the liquid phase, and a flow divider, to divide the condensed coolant current, directing the primary flow towards the pump and the secondary flow towards the rolling valve;

a 3-way valve connected to the turbine, such that upon activation air is redirected exiting the turbine directly towards the regenerator without previously passing through the heat exchanger;

wherein the regenerator receives the compressed air current of the first compressor, to reduce the temperature thereof, and the air current of the heat exchanger, to heat it by means of heat exchange between both;

wherein the first cooler is connected to the first compressor and intended to reduce the temperature of the air current compressed by the first compressor; and wherein the equipment further comprises:

at least one second compressor, configured to absorb air from the first cooler and increase the pressure thereof, and at least one second cooler, connected to the second compressor and to the regenerator, to reduce the temperature of the air current compressed by the second compressor and deliver it to the regenerator, wherein the turbine is mechanically connected to the second compressor, such that it transfers mechanical energy thereto, and characterised in that the first cooler and the second cooler operate with a coolant selected from ammonia or carbon dioxide.

\* \* \* \* \*